United States Patent [19]

Sawaki et al.

[11] 4,409,634
[45] Oct. 11, 1983

[54] TAPE RECORDER

[75] Inventors: Ryoichi Sawaki; Toshihiko Kadota, both of Hachioji, Japan

[73] Assignee: Olympus Optical Company Limited, Tokyo, Japan

[21] Appl. No.: 261,754

[22] Filed: May 8, 1981

[30] Foreign Application Priority Data

May 12, 1980 [JP] Japan .............................. 55-64631[U]

[51] Int. Cl.³ ............................................ G11B 15/04
[52] U.S. Cl. .............................. 360/137; 200/DIG. 34
[58] Field of Search ................. 360/137, 60; 200/340, 200/324, 159 R, 308, 312, DIG. 25, DIG. 34; 340/365 R, 365 P, 365 C; 334/227-232

[56] References Cited

U.S. PATENT DOCUMENTS 1,377,070 5/1921 Helguera ........................ 434/231 X
2,522,423 9/1950 Youhouse ............................ 200/312

FOREIGN PATENT DOCUMENTS 181308 7/1954 Austria ................................. 200/308
2033540 1/1971 Japan ................................... 360/137

Primary Examiner—John H. Wolff
Attorney, Agent, or Firm—Toren, McGeady and Stanger

[57] ABSTRACT

A tape recorder capable of detecting and discriminating the position of an operating button by the touch of a finger tip comprises a projected wall having a predetermined configuration positioned along each of the operating buttons provided in the tape recorder casing.

1 Claim, 7 Drawing Figures

TAPE RECORDER

BACKGROUND OF THE INVENTION

The present invention relates to a tape recorder capable of detecting and discriminating the positions of operating buttons by a finger touch.

Recently, tape recorders have tended to be miniaturized and electronized and to use touch-type operating buttons as controls for recording and reproduction.

A superminiature tape recorder of this type in accordance with the prior art includes a tape recorder body 1 as shown in FIG. 1, which is arranged with a cassette tape chamber 2 and a loud speaker hole 3 in front and provided with touch-type operating buttons 4 (REC, STOP, PLAY, REW, FF in the illustrated embodiment) corresponding to each kind of operating mode between the cassette chamber 2 and the loud speaker hole 3. In this case, each kind of the touch-type operating buttons 4, as shown in FIG. 2a, are arranged along the widthwise direction of the tape recorder body 1 and as shown in FIG. 2b, arranged in line along a button support stand 5 which is slightly recessed.

In such tape recorder, therefore, the tape recorder body 1 is gripped by one hand in the same manner as that in which an electronic calculator is generally used and the buttons are operated by the finger of the other hand as the position of each operating button 4 is confirmed by sight.

If this tape recorder, however, is used in a dark room, it becomes difficult to distinguish the position of the operating buttons and each kind of operation, and it is liable to cause misoperation. This means that particularly when the recording (REC) operating button 4 is operated by mistake, the recorded contents will be mistakenly erased, which is to be clearly avoided.

SUMMARY OF THE INVENTION

An object of the present invention is to eliminate the above disadvantages of the conventional tape recorder.

Another object of the present invention is to provide a tape recorder which can detect and discriminate the positions of operating buttons by finger touch only by providing a projected wall having a predetermined configuration along each kind of operating button.

According to the present invention there is provided a tape recorder comprising a tape recorder casing, a cassette tape chamber, a loudspeaker, operating buttons and tactile indicating means comprising a projected wall having a predetermined configuration positioned along the operating buttons corresponding to each kind of operation mode provided in the casing and for detecting and discriminating the position of the operating buttons. In accordance with the various embodiments of the invention, the projected wall is provided with a projection at a location corresponding to a recording button, the projected wall is formed by surrounding the recording button, the projected wall is formed with a step-like configuration, or the projected wall is formed into a recess form.

DESCRIPTION OF THE PREFERRED EMBODIMENT

Figure 1:
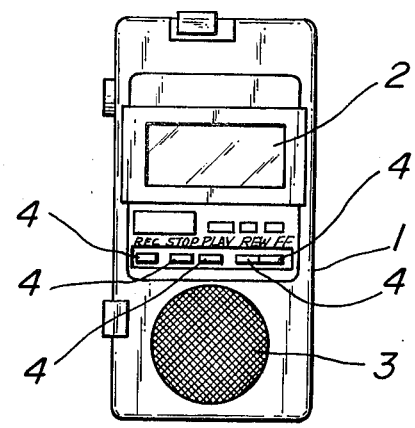
FIG. 1 is plan view showing a configuration of an embodiment of a conventional tape recorder.
Figure 2A:
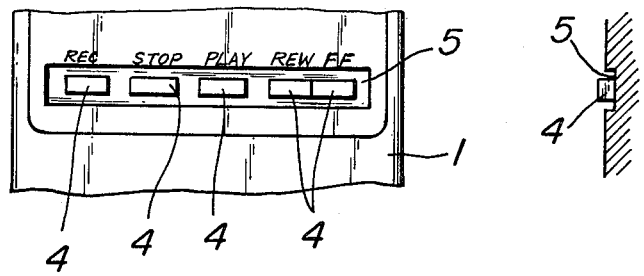
FIGS. 2a and 2b are an enlarged plan view and an enlarged cross-sectional view showing each kind of operating button of the tape recorder shown in FIG. 1.
Figure 2B:
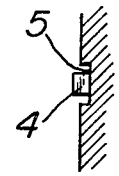
Figure 3:
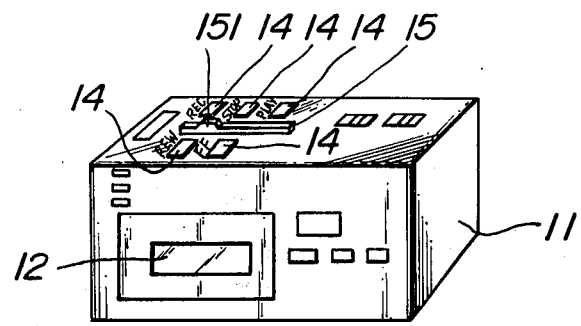
FIG. 3 is a perspective view showing a configuration of one embodiment of a tape recorder according to the present invention.

Referring now to the drawings, wherein the same reference characters designate the same or corresponding parts throughout the several views, FIG. 3 shows an embodiment of a tape recorder according to the present invention.

Figure 4:
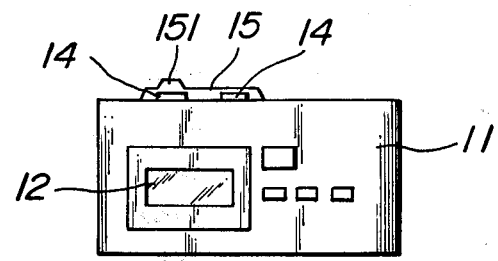
FIG. 4 is front view of the tape recorder shown in FIG. 3.

In FIG. 3, reference numeral 11 is a tape recorder body or casing, and a front surface of the body 11 is provided with a cassette chamber 12. Moreover, on the side surface of the body 11 there are arranged two rows of touch-type operating buttons (REC, STOP, PLAY, REW, FF) 14 corresponding to each of the operation modes. Along and between each row of these operating buttons 14 there is provided tactile indicating means in the form of a projected wall 15, and a projection 151 is formed at a portion corresponding to the recording operating button (REC) 14 of the projected wall 15. In this case, the projected wall 15 is sufficiently projected from the operating button 14 as shown in FIG. 4.

In such a tape recorder, the tape recorder body 11 is gripped by the right hand for example and each of the operating buttons 14 is operated by the thumb thereof. In this case, the projected wall 15 is formed along the operating buttons 14, so that positions of the operating buttons 14 can be confirmed by touch of the thumb only. Moreover, the recording (REC) operating button 14 can easily be distinguished at the projection 151 of the projected wall 15, while each of the other operating buttons 14 can be distinguished on the basis of the recording (REC) operating button 14.

According to such construction, therefore, the position of the operating button is not only detected but also discriminated by the touch of a finger tip, so that even if the tape recorder is used in a dark place for example, the misoperation of the operating button can positively be prevented and the stable tape recorder operation can be expected. Particularly, since the recording operating button is precisely located and discriminated, any disadvantage such as erroneous erasing of the recorded contents by misoperation of the recording operating button or the like can positively be avoided and reliable operation is ensured.

Figure 5:
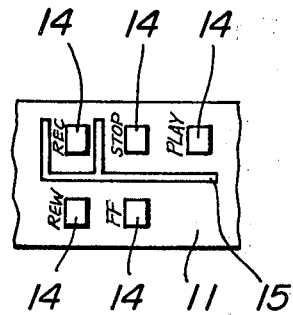
FIGS. 5 and 6 are enlarged plan views showing the essential parts of another embodiment of the tape recorder according to the present invention.
Figure 6:
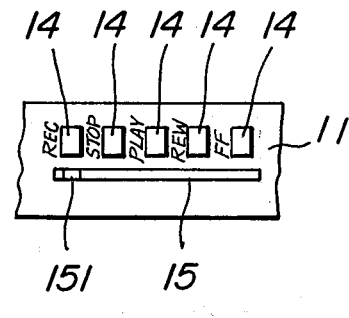

The present invention is not limited to the above embodiment but can be modified without departing from the scope of the invention. For example, in the above embodiment, the projection 151 is formed at a portion corresponding to the recording (REC) operating button 14 of the projected wall 15, but as shown in FIG. 5, it is preferable to surround the recording (REC) operating button 14 with the projected wall 15. Moreover, as shown in FIG. 6, when the operating buttons 14 are arranged in line, a straight projected wall 15 may be formed along these operating buttons 14 and a projection 151 may be provided at a portion corresponding to the location of the recording operating button 14. Moreover, the projected wall is naturally formed into a recess instead of the projection 151. Moreover, the projected wall is formed into a step-like form for identifying each of the operating buttons by the height of the projected wall 15 at each portion.

As described above, the present invention can provide a tape recorder for detecting and discriminating the position of an operating button by the touch of a finger tip only by providing a projected wall having a predetermined configuration along each of the operating buttons.

While specific embodiments of the invention have been shown and described in detail to illustrate the application of the inventive principles, it will be understood that the invention may be embodied otherwise without departing from such principles.

What is claimed is:

1. An audio tape mechanism comprising:

a casing;

a cassette tape chamber for receiving a tape cassette therein;

speaker means for generating sound developed from operative engagement of a tape cassette placed within said tape chamber with said audio tape mechanism;

control means within said audio tape mechanism for controlling operation of said tape cassette to enable said audio tape mechanism to both record sound on said tape cassette and to reproduce recorded sound through said speaker means;

a plurality of operating buttons located on the exterior of said casing for enabling selective actuation of said control means for effecting controlled actuation of said audio tape mechanism, said operating buttons including a record button capable of effecting operation of said audio tape mechanism to record sound on said tape cassette while simultaneously erasing any sound previously recorded thereon; and tactile indicating means arranged on said casing adjacent said buttons to enable said buttons to be distinguished one from the other by human touch alone, said tactile indicating means including means for enabling said record button to be readily distinguished from the others of said plurality of buttons;

said tactile indicating means comprising a projected wall arranged to project from the surface of said casing, said projected wall being formed with a portion extending about said record button on at least three sides thereof.

* * * * *